June 20, 1967   J. G. F. HEUVEL   3,326,564
SKI WITH TORSIONAL-RESPONSIVE RIGIDITY
Filed Oct. 28, 1964   2 Sheets-Sheet 1
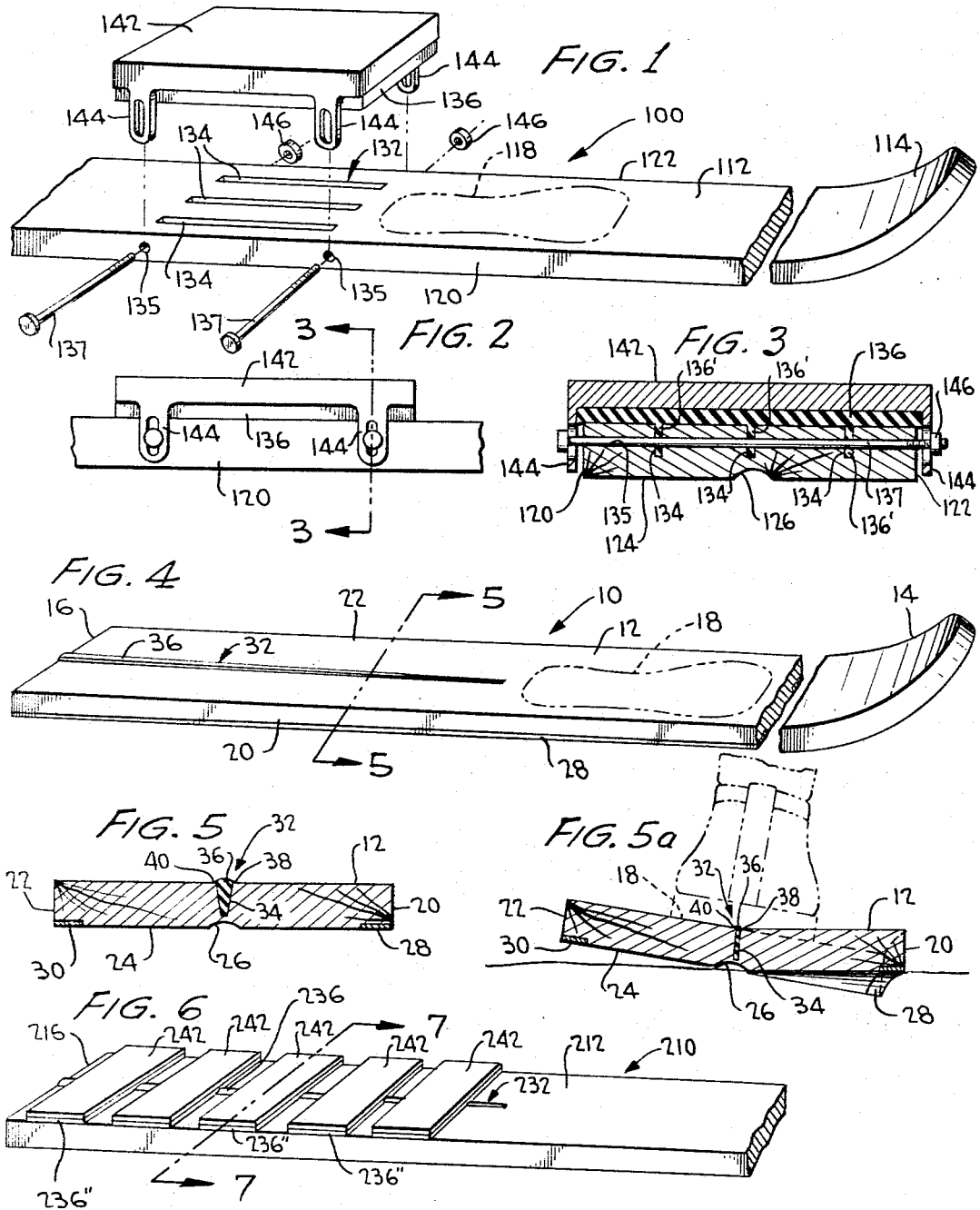
INVENTOR,
JOHAN G. F. HEUVEL
BY Samuel Meerkrebs
ATTORNEY

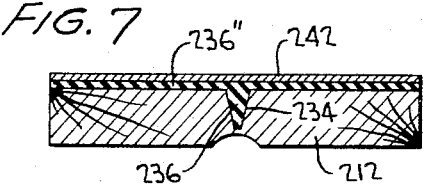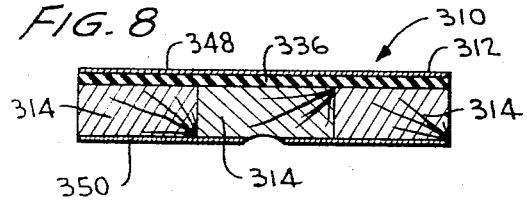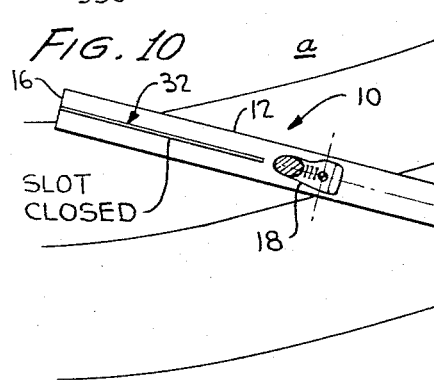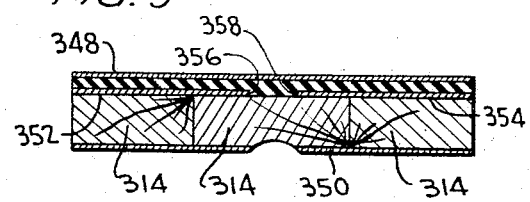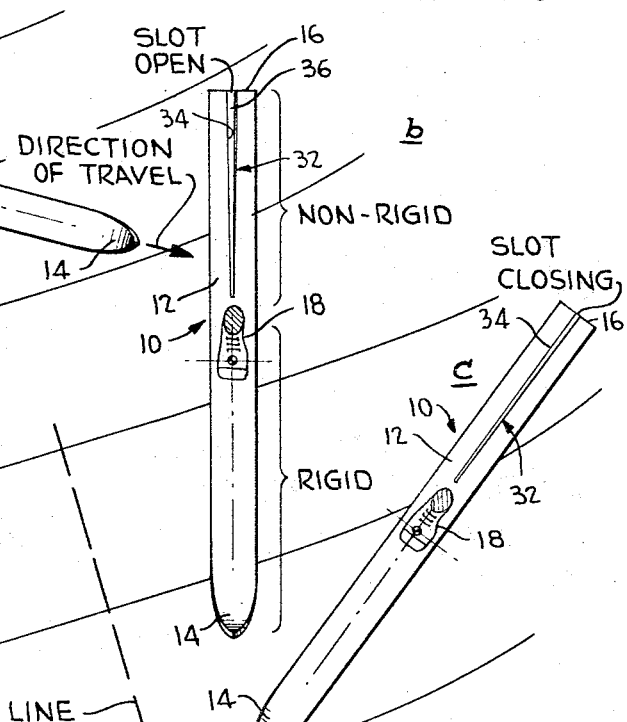

United States Patent Office 3,326,564
Patented June 20, 1967

3,326,564
SKI WITH TORSIONAL-RESPONSIVE RIGIDITY
Johan G. F. Heuvel, 7895 Mountain Sights, Apt. 35,
Montreal, Quebec, Canada
Filed Oct. 28, 1964, Ser. No. 407,129
14 Claims. (Cl. 280—11.13)

This invention relates generally to skis for negotiating a snow-covered slope and more particularly to improved maens to automatically provide "side slip" when a turn is negotiated.

Briefly, when skiing down a slope, relatively high speeds are developed with the accompanying inertia force, i.e., the force that tends to make objects continue to move in the direction they are moving. Only the expert skier can descend directly down the fall line of a relatively steep slope, and even the expert must ski under "control." Skiing under "control" involves "edging" of the skis at an angle to the fall line of a slope with the accompanying shifting of the skier's weight depending upon whether a right or left turn is being made.

The intermediate or beginner, and even the expert, rarely, if ever, "schuss," i.e., descends directly down the fall line of a slope, but on the contrary, selects an angle. Traversing the slope or fall line where he can attain the speed at which he can descend under "control." The majority of ski slopes are "tailored," i.e., maintained between drop-offs, woods, etc. and thus have side margins.

In order to negotiate or turn when approaching the side margin of a slope, the skier causes an "uplift" by rising suddenly which momentarily relieves the weight on the skis. As the weight is relieved, the skier changes the direction of the skis which is accomplished by a weight shift and normally permits "side-slip" which accompanies the turn, i.e. the ski tails tend to continue due to the inertial or centrifugal force in the direction the skier was moving before the turn was initiated.

The skier due to angling of the skis relative to the longitudinal axis of the skis, permits a certain amount of "side-slip" to absorb the inertia forces and subsequently causes the edges of the skis to "edge" and thus once more skis under "control."

Side slipping is a must when either making a "Christiana" or "Parallel" turn, and it is this maneuver which is often an unsurmountable "hurdle" which distinguishes the beginner from the intermediate and expert skiers.

Conventional skis will have a built-in torsional resistance, i.e., twist about the longitudinal axes and there is no means to permit conventional skis not to edge initially after a turn has been negotiated to insure side-slip during and dissipation of excess inertia or centrifugal forces.

A primary object of the present invention is to provide a ski with means providing torsional-responsive rigidity.

Another object of the present invention is to provide a ski of the character mentioned in which a ski member includes relief means for permitting torsional flexure up to a certain limit whereafter torsional-rigidity permits edging of the skis.

A still further object of the present invention is to provide torsional flexure in a ski body member and stop means for attaining torsional rigidity after certain limits to accordingly substantially permit sequential "side-slip" and "edging."

Other and more specific objects of the present invention will become apparent from a consideration of the following description and the accompanying drawing forming a part thereof, in which several embodiments, are disclosed by way of example and not limitation.

In the drawing:
FIG. 1 is an exploded perspective view of a ski incorporating one embodiment of the invention with the area incorporating the "binding" being shown by phantom lines;

FIG. 2 is an enlarged fragmentary intermediate side elevation of a portion of the ski of FIG. 1 after the ski has been assembled;

FIG. 3 is a vertical section taken on the plane of line 3—3 of FIG. 2;

FIG. 4 is a perspective view showing another embodiment of the invention;

FIG. 5 is an enlarged vertical section taken on line 5—5 of FIG. 4;

FIG. 5a is a view similar to FIG. 5 showing by phantom lines a ski boot and the attitude assumed by the ski edge when torsional-rigidity occurs after the termination of a "side-slip";

FIG. 6 is a fragmentary perspective view of still another embodiment of the invention;

FIG. 7 is an enlarged vertical section taken on the plane of line 7—7 of FIG. 7;

FIG. 7a is a view similar to FIG. 7 illustrating the attitude of the ski body after torsional-rigidity occurs;

FIG. 8 is a vertical section of still another embodiment of the invention;

FIG. 9 is a vertical section of yet another embodiment of the invention; and

FIG. 10 is a diagrammatic view showing at a, b, c and d, respectively, diagrammatic views progressively illustrating the function of a ski due to different conditions of torsional-rigidity (edging when traversing in one direction); "uplift" and elimination of torsional rigidity (when changing direction of ski); weight also as ski comes around in a turn (side-slip occurring); and reassuming torsional rigidity (edging) and traversing in the opposite direction, respectively.

Referring to the drawing in detail and first considering FIGURES 4–5a, a single ski is indicated generally at 10 and comprises an elongated body member 12 having a tip portion 14 and tail portion 16. The body member 12 may comprise a single piece of ash, hickory, etc., laminates of wood-and-plastic, laminates of metal-and-plastic and laminates of wood-and-metal and other permutations of the materials used in the production of skis.

The body member 12 will have fitted thereto suitable boot-binding, i.e., safety-release, etc., however, since the binding may assume any suitable character, the general boot-binding portion is indicated by phantom lines at 18.

For purposes of reference, the body member includes opposed side edges 20 and 22 and a bottom running surface 24, including a downwardly opening, longitudinal flute or groove 26. There may be suitably secured to the bottom surface 24 (in any suitable manner) and flush therewith, suitable edge elements 28 and 30 which have relatively sharp lower corners. The edge elements are conventional and thus they will not be shown or mentioned with respect to other embodiments.

The body member has incorporated therein means for affording torsional rigidity in relation to the torque or twist applied to the skis. It will be understood that although skis are generally used in matched pairs, only one ski will be described in detail.

The body member includes in the upper surface thereof relief means indicated generally at 32 comprising a groove 34 extending into the tail portion 16 and terminating above the running or bottom surface of the ski. The cross section of the groove 34 is generally frusto-triangular, however, it may assume other shapes, as will be apparent from subsequently described embodiments. Preferably, but not necessarily, the groove 34 is filled with a suitably bonded resilient and yieldable strip element 36 which has a dual function (1) maintains the ski in the condition shown in FIGURE 5 and when compressed, as seen in FIGURE 5a, returns the ski to its normal condition, and (2) prevents snow and ice from accumulating in the groove 34 so that the ski functions under the conditions for which it is designed.

Under normal conditions, i.e., no turns and when traversing gentle slopes, the ski is sufficiently rigid to permit the amount of edging required. However, when excessive twist or torque is applied to the ski, i.e., during traversing an exceptionally steep slope or when making a "christie" or "parallel" turn, the means for permitting progressive torsional rigidity comes into operation.

Note, for example, in FIGURE 10a, the ski 10 is going across or traversely with respect to the "FALL LINE" (directly down slope), under this condition, if the skier has edged the ski, the edge element 28 (see FIG. 5a) is cutting into the snow or ice of the slope. This is accomplished by a definite lateral tilting of the ski by thrusting the ankles into or toward the slope. If the twist or torque applied to the ski is sufficient, the opposite side edges of the groove 34 (see edges 38 and 40) are urged together, and the yieldable element 36 is compressed (see FIGURE 5a).

The skier also has his weight forward, i.e., his knees and ankles are bent, and he assumes in a sense a crouched position. When a turn is to be negotiated, without going into details of a weight shift or positioning of the shoulders, the skier rises suddenly, i.e., relieves the weight on the skis, and at this time he shifts the skis to a momentary direct down hill condition. When the weight is relieved and when facing momentarily crossing or having the ski crossing the fall line, the slot is open and no edging of the ski occurs.

The inertia of the skier's weight, etc., tend to cause him to move in the "direction of travel" according to FIGURE 10a. However, the same inertial force or centrifugal force when negotiating a somewhat circular turn, aids the ski tail to move past the fall line, and as the groove is closing, i.e., the skier is now attempting to gain control by "edging" a side slip is automatically afforded until the groove or slot 34 once more closes and full edging is afforded as illustrated in FIGURE 10d.

A turn for the beginner skier is quite a traumatic experience because he invariably gains speed when crossing the fall line of a slope. Instructors generally emphasize the side-slip to dissipate the increased speed, however, there is also involved during a turn a weight shift, i.e., change of shoulder position, and ankle thrust all accomplished while moving. The present invention automatically affords the side slip without the concentrated ankle thrust, and the skier is afforded one less physical movement to concentrate upon and leaves him some degree of time to concentrate on weight, or shoulder shift, which will automatically aid the side slip which is being sought at the terminal end of a turn.

Although the just described embodiment and means for affording torsional rigidity behind the boot-binding will function as set forth in the objects of the invention, the invention contemplates selected relieved areas which will afford torsional rigidity in relation to the degree of applied torque.

Considering FIGURES 1-3, for example, a ski is indicated generally at 100 and comprises a body member 112 including a tip portion 114 and tail portion (not shown). The ski includes a boot-binding portion 118, has opposed side edges 120 and 122, a running surface 124 and longitudinal flute 126. The running surface 124 will incorporate in the lower edges, if preferred, metal edges such as those shown at 28 and 30 in FIGURES 4, 5 and 5a.

The embodiment of FIGURES 1-3 also includes means for affording selected torsional rigidity which comprises relieved plural groove means indicated generally at 132 comprising a plurality of longitudinally disposed grooves or slots 134 which do not, in this embodiment, extend to the tail portion of the body member. The body member 112 has formed therein bore portions 135 which will have terminally threaded, headed pins 137 extending therethrough.

A resilient block or pad 136 having depending strips 136' will overlie the grooves 134 with the strips 136' filling the grooves. The pins 137 will be flexible and permit bending due to torque imposed on the ski body member, and the pins extend through the strips 136' and the grooves 134. A mechanical stop plate 142 overlies the pad 136 and includes depending and tranversely slotted flange portions 144. The pins 137 extend through the flanges 144 and a nut element or comparable fastener element means 146 is provided to retain the mechanical stop plate, and pad 136 in assembled relation on the ski.

Twist or torque applied to the ski, during the conditions mentioned regarding FIGURES 4-5a, results in torsional rigidity occurring due to relative movement of the headed pins 137 in the slots of flanges 144, i.e., after a predetermined amount of twisting, the rigid plate or stop 142 will substantially prevent additional twist to afford proper edging and control.

Considering FIGURES 6-7a, a fragmentary portion of a ski is indicated generally at 210 and includes on a fragmentary portion of a body member 212 and extending through to a tail portion 216, groove or relief means 232. The groove 234 (see FIGURE 7) has a cross section similar to that of FIGURE 5, and in this embodiment a resilient and yieldable and compressible element 236 in addition to filling the groove 234 includes a plurality of transverse resilient pads 236'' which are suitably bonded to the upper surface of the ski body member. Leaf-spring elements 242 overlie the pads 236'' and are bonded thereto, and in a sense, provide mechanical stops so that initial compression of the pads 236'' and strip 236 occurs and subsequent bending of the springs 242 occurs when extreme twisting torque is applied.

FIGURE 5a, for example, illustrates perspectively the twist or torque that occurs during side-slip and edging.

Considering FIGURE 8, this is a cross section of a ski 310 which has a metal sheath or covering. This ski includes a body member 312 comprising a core formed from a plurality of elongated wooden elements 314 having abutting free edges. Juxtaposed on selected areas on the upper surface of the elements 314 is a yieldable and resilient pad 336 which will permit a limited amount of twisting until the entire ski twists. The ski is generally encased in a metal skin, as indicated at 348 and 350.

In FIGURE 9, in addition to the structure of FIGURE 8, another expedient to provide localized or selected twist in certain areas are metal plates 352 and 354 which include spaced inner edges 356 and 358, respectively. The ski of FIGURE 9 includes the core elements 314; a pad 336 is enclosed in a metal sheath 348 and 350.

It will be obvious to those skilled in the art, that various changes may be made without departing from the spirit of the invention and therefore the invention is not limited to what is shown and described but only as indicated by the appended claims.

What is claimed is:

1. In a pair of skis for negotiating a snow-covered slope, at least one ski comprising an elongated body member, means on said body member for affording progressive torsional rigidity from a free side-slip during a turn to edging of said ski, said means comprising a weakened portion comprising relief groove means opening into the upper surface of said body member, said relief groove means including upper opposed edge portions engageable during torsional deflection for determining maximum torsional deflection prior to edging of the ski body member.

2. The structure as claimed in claim 1 in which said ski member includes a boot-binding area, said groove means being located on said body member substantially rearwardly of said boot-binding area.

3. The structure as claimed in claim 1 including yieldable packing means filling said relief groove means.

4. The structure as claimed in claim 1 in which said relief groove means is disposed intermediately of said body member.

5. The structure as claimed in claim 1 in which said relief groove means extends to the terminal end of said body member.

6. The structure as claimed in claim 5 in which at least one rigid plate overlies said relief groove means for permitting limited torsional deflections up to edging of said ski body member.

7. The structure as claimed in claim 6 including a resilient packing disposed in said relief groove means for preventing snow and ice from accumulating therein.

8. The structure as claimed in claim 1 including mechanical stop means overlying said relief groove means for limiting torsional deflection of said ski body member.

9. The structure as claimed in claim 8 in which said relief groove means comprises a plurality of grooves on said body member, pin means extending through opposed sides of said body member and through said grooves, a relatively rigid plate overlying said grooves and including opposed edge flange portions flanking side edges of said body member, said flange portions including lost-motion connection means engaged with the terminal end portions of said pin means for determining maximum torsional deflection of said ski body member prior to edging.

10. The structure as claimed in claim 1 in which said means for affording progressive torsional rigidity comprises adjacent portions of said body member and in which said adjacent portions have relative variable torsional deflection in relation to said body member.

11. In a pair of skis for negotiating a snow-covered slope, at least one ski comprising an elongated body member, said body member including means for providing progressive torsional rigidity from a free side-slip during a turn to edging of said ski, said means for providing progressive torsional rigidity comprising adjacent portions of said body member having relative variable torsional deflection in relation to said body member, said body member including a base core, a pair of relatively rigid elements overlying said base core and including spaced inner edges determining maximum torsional deflection prior to edging.

12. The structure as claimed in claim 11 in which said ski body member includes a laminated sealing layer of material overlying said relatively rigid elements.

13. The structure as claimed in claim 11 in which said base core comprises a plurality of longitudinally disposed, elongated segments having abutting free edges, a pad overlying said free edges and yieldably secured thereto whereby torsional deflection is permitted up to a determinable maximum prior to edging of the ski.

14. The structure as claimed in claim 13 in which said relatively rigid plates overlie said segments and include spaced inner edges.

References Cited
UNITED STATES PATENTS

| | | | |
|---|---|---|---|
| 1,552,990 | 9/1925 | Hunt | 280—11.13 |
| 2,661,219 | 12/1953 | Coulson | 280—11.13 |
| 2,995,379 | 8/1961 | Head | 280—11.13 |

FOREIGN PATENTS

| | | |
|---|---|---|
| 182,660 | 7/1955 | Australia. |
| 1,285,981 | 1/1962 | France. |
| 94,867 | 8/1959 | Norway. |

BENJAMIN HERSH, *Primary Examiner.*

MILTON SMITH, *Examiner.*